United States Patent
Li et al.

(10) Patent No.: US 9,426,009 B2
(45) Date of Patent: *Aug. 23, 2016

(54) MIMO OFDM SYSTEM

(75) Inventors: Ye Li, Holmdel, NJ (US); Nelson Ray Sollenberger, Farmingdale, NJ (US); Jack Harriman Winters, Middletown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1235 days.

This patent is subject to a terminal disclaimer.

(21) Appl. No.: 13/296,610

(22) Filed: Nov. 15, 2011

(65) Prior Publication Data

US 2012/0057661 A1 Mar. 8, 2012
US 2012/0321023 A9 Dec. 20, 2012

Related U.S. Application Data

(63) Continuation of application No. 12/621,335, filed on Nov. 18, 2009, now Pat. No. 8,121,022, which is a continuation of application No. 11/380,531, filed on Apr. 27, 2006, now Pat. No. 7,643,404, which is a continuation of application No. 09/791,523, filed on Feb. 23, 2001, now Pat. No. 7,068,628.

(60) Provisional application No. 60/206,182, filed on May 22, 2000.

(51) Int. Cl.
*H04L 27/26* (2006.01)
*H04L 1/06* (2006.01)

(52) U.S. Cl.
CPC .......... *H04L 27/2601* (2013.01); *H04L 1/0618* (2013.01)

(58) Field of Classification Search
None
See application file for complete search history.

(56) References Cited

U.S. PATENT DOCUMENTS

| 4,904,895 | A | 2/1990 | Tsukamoto et al. .......... 313/336 |
| 5,481,565 | A | 1/1996 | Pal ................................ 375/232 |
| 5,550,810 | A | 8/1996 | Monogioudis et al. |
| 5,553,102 | A | 9/1996 | Jasper et al. .................. 375/347 |

(Continued)

FOREIGN PATENT DOCUMENTS

| JP | 60-216387 | 4/1984 | .............. G09G 3/12 |
| JP | 62-206589 | 9/1987 | .............. G09G 3/22 |

(Continued)

OTHER PUBLICATIONS

Li, et al., "Channel Estimation for OFDM Systems with Transmitter Diversity in Mobile Wireless Channels," IEEE J. on Selected Areas in Communications, vol. 17, No. 3, Mar. 1999, pp. 461-471.

(Continued)

*Primary Examiner* — Donald Mills
(74) *Attorney, Agent, or Firm* — Abel Law Group, LLP

(57) ABSTRACT

A MIMO OFDM system includes a plurality of space-time encoders for encoding respective data blocks with independent space-time codes. The transformed data block signals are transmitted by a plurality of transmit antennas and received by a plurality of receive antennas. The received data is pre-whitened prior to maximum likelihood detection. In one embodiment, successive interference cancellation can be sued to improve system performance. Channel parameter estimation can be enhanced by weighting the channel impulse response estimates based upon a deviation from average.

8 Claims, 10 Drawing Sheets

(56) References Cited

U.S. PATENT DOCUMENTS

| | | | | |
|---|---|---|---|---|
| 5,569,974 | A | 10/1996 | Morikawa et al. | 313/310 |
| 5,614,914 | A | 3/1997 | Bolgiano et al. | 342/364 |
| 5,648,992 | A | 7/1997 | Wright et al. | 375/347 |
| 5,682,085 | A | 10/1997 | Suzuki et al. | 315/169.1 |
| 5,949,833 | A | 9/1999 | Weerackody | 375/347 |
| 5,973,642 | A | 10/1999 | Li et al. | 342/378 |
| 6,061,327 | A | 5/2000 | Demoulin et al. | |
| 6,144,711 | A | 11/2000 | Raleigh et al. | 375/347 |
| 6,249,250 | B1 | 6/2001 | Namekata et al. | 342/372 |
| 6,249,253 | B1 | 6/2001 | Nielsen et al. | 342/463 |
| 6,351,499 | B1 | 2/2002 | Paulraj et al. | 375/267 |
| 6,441,786 | B1 | 8/2002 | Jasper et al. | 342/383 |
| 6,470,044 | B1 | 10/2002 | Kowalski | 375/148 |
| 6,477,210 | B2 | 11/2002 | Chuang et al. | 375/340 |
| 6,765,969 | B1 | 7/2004 | Vook et al. | 375/259 |
| 6,826,240 | B1 | 11/2004 | Thomas et al. | 375/340 |
| 7,936,740 | B2 | 5/2011 | Fujii | 370/342 |
| 8,121,022 | B2 * | 2/2012 | Li et al. | 370/208 |
| 2001/0053143 | A1 | 12/2001 | Li et al. | 370/344 |
| 2004/0131011 | A1 | 7/2004 | Sandell et al. | 370/210 |

FOREIGN PATENT DOCUMENTS

| | | | |
|---|---|---|---|
| JP | 63-304228 | 12/1988 | G02F 3/22 |
| JP | 1031332 | 2/1989 | H01J 1/20 |
| JP | 02273720 | 6/1990 | G02F 1/133 |
| JP | 02272490 | 7/1990 | G09G 3/36 |
| JP | 2257551 | 10/1990 | H01J 31/15 |
| JP | 03048889 | 1/1991 | G09G 3/36 |
| JP | 4028137 | 1/1991 | H01J 1/30 |
| JP | 3055738 | 3/1991 | H01J 1/30 |
| JP | 04204993 A | 7/1992 | G09G 3/36 |
| JP | 4-107293 | 9/1992 | G09G 3/12 |
| JP | 10-172479 | 6/1996 | G09G 3/26 |
| JP | H08-265184 | 11/1996 | |
| JP | 11-167366 | 6/1999 | G09G 3/20 |
| WO | WO 98/09381 | 3/1998 | |
| WO | WO 99/45657 | 9/1999 | |

OTHER PUBLICATIONS

Dittmer, G., "Electrical Conduction and Electron Emission of Discontinuous Thin Films", Thin Film Solids, 9 (1972), pp. 317-328.

Asaki, H., et al. "Electroforming and Electron Emission of Carbon Thin Films", Vacuum, vol. 26, No. 1, pp. 22-29 (1983).

Hartwell, M., et al. "Strong Electron Emission from Patterned Tin-Indium Oxide Thin Films", International Electron Devices Mtg., Washington, DC (1975), pp. 519-521.

Elinson, M. I., "The Emission of Hot Electrons and the Field Emission of Electrons from Tin Oxide", Radio Engineering and Electronic Physics, Jul. 1965, pp. 1290-1296.

Nishimura, T. et al. "Space Domain-Multistage Interference Canceller for SDMA", Technical Research Report of the Institute of Electronics, Information and Communications Engineers, Oct. 15, 1999 vol. 99, No. 357, pp. 103-108, RCS99-136.

European Search Report from Application No. EP01111246 dated Apr. 2004.

Ariyavisitakul, S., et al. "Optimum Space-Time Processors with Dispersive Interference: Unified Analysis and Required Filter Span", IEEE Transactions on Communications, vol. 47, No. 7, Jul. 1999, pp. 1073-1083.

Giancola, D., et al., "Variable Rank Receiver Structures for Low-Rank Space-Time Channels", 1999 IEEE, pp. 65-69.

Li, et al., "Signal Detection for MIMO-OFDM Wireless Communications", 2001 IEEE, pp. 3077-3081.

Ishi, N., et al. "Spatially and Temporally Joint Transmitter—Receiver Using an Adaptive Array Antenna", IEICE Trans. On Communication, Mar. 1966, vol. E78-B, No. 3, pp. 361-367.

Lozano, A., et al. "Space-Time Receiver for Wideband BLAST in Rich-Scattering Wireless Channels", Vehicular Technology Conference Proceedings 2000, IEEE, May 18, 2000, vol. 1, pp. 186-190, VTC2000-Spring.

Dyke, W. P., et al. "Field Emission", Advances in Electronics and Electron Physics (1956), pp. 89-186.

"Physical Properties of Thin-Film Field Emission Cathodes with Molybedium Cones", J. Appl. Phys., 47, 5248 (1976), pp. 5248-5263.

Mead, C.A., "Operation of Tunnel-Emission Devices", J. Appl. Phys. vol. 32, No. 4, Apr. 1961, pp. 648-652.

* cited by examiner

MIMO OFDM SYSTEM

CROSS REFERENCE TO RELATED APPLICATIONS

The present application is a continuation of U.S. patent application Ser. No. 12/621,335, filed on Nov. 18, 2009, now U.S. Pat. No. 8,121,022, issued Feb 21, 2012, which is a continuation of U.S. patent application Ser. No. 11/380,531 filed on Apr. 27, 2006, now U.S. Pat. No. 7,643,404, issued Jan. 5, 2010, which is a continuation of U.S. patent application Ser. No 09/791,523 filed on Feb. 23, 2001, now U.S. Pat. No. 7,068,628, issued Jun. 27, 2006, which claims benefit of U.S. Provisional Patent Application No. 60/206,182, filed May 22, 2000, all of which applications are incorporated herein by reference.

STATEMENT REGARDING FEDERALLY SPONSORED RESEARCH

Not applicable

FIELD OF THE INVENTION

The present invention relates generally to communication systems and, more particularly, to Orthogonal Frequency Division Multiplexed (OFDM) communication systems.

BACKGROUND OF THE INVENTION

High data-rate wireless access is demanded by many applications. Traditionally, more bandwidth is required for higher data-rate transmission. However, due to spectra limitations, techniques for increasing bandwidth are often impractical and/or expensive. In one known system, multiple transmit and receive antennas are used to obtain transmit diversity or to form multiple-input multiple-output (MIMO) channels. Multiple transmit antennas have also been used to provide diversity in wireless systems. Transmit diversity can be based on linear transforms or by space-time coding. Space-time coding in particular is characterized by high code efficiency and can improve the efficiency and performance of Orthogonal Frequency Division Multiplexing (OFDM) systems. The system capacity can be further improved if multiples transmit and receive antennas are used to form MIMO channels. Compared with a signal-input single-OUTPUT (SISO) system with flat Rayleigh fading or narrowband channels, a MIMO system can improve the capacity by a factor of the minimum of the number of transmit and received antennas.

FIG. 1 shows a conventional OFDM system 10 including subsystems for transmission and reception of data. A coding subsystem 12 encodes binary data from a data source. The coded data is interleaved by an interleaving subsystem 14 and then mapped onto multi-amplitude multi-phase constellation symbols by a mapping subsystem 16. In one particular embodiment, the multi-amplitude multi-phase constellation symbols include quadrature phase shift keying (QPSK) symbols. Pilot signals can then inserted by a pilot insertion subsystem 18 to estimate the channel at the remote subscriber unit receivers. A serial-to-parallel conversion subsystem 20 converts the serial data stream to a parallel data stream that is provided to an inverse fast Fourier transform (IFFT) subsystem 22.

The transformed data is converted to serial data stream by a parallel-to-serial converter 24. Cyclic extension and windowing can be added by a subsystem 26 prior to digital-to-analog conversion by a DAC 28 and transmission by an antenna system 30. The receive portion 32 of the OFDM system includes similar corresponding components for extracting the data from the received OFDM signal.

As shown in FIG. 2, the known OFDM system 10 utilizes an overlapping orthogonal multicarrier modulation technique having a plurality of subcarriers 50. FIG. 3 shows the orthogonal nature of the subcarriers. More particularly, each of four subcarriers 60 of one OFDM data symbol has an integral number of cycles in the interval T. The number of cycles between adjacent subcarriers differs by one.

In one known OFDM transmission system, the complexity of the space-time processor increases as the bandwidth increases and the performance of the space-time processor is significantly degraded when estimated channel parameters are used to construct space-time processors.

It would, therefore, be desirable to provide a MIMO OFDM system having enhanced signal detection. It would further be desirable to increase the accuracy of channel parameter estimates.

SUMMARY OF THE INVENTION

The present invention provides a MIMO OFDM system utilizing independent space-time codes for multiple transmit antenna sets. The receiver decodes the space-time codes using pre-whitening followed by maxiumum likelihood decoding. With this arrangement, the MIMO OFDM system provides spectrally efficient wideband communication. The MIMO-OFDM system determines and uses channel delay profile estimates to achieve more accurate channel parameter estimation.

In one aspect of the invention, a MIMO OFDM communication system includes a plurality of transmit antennas and a plurality of receive antennas. First and second data blocks are each transformed into two signals by respective first and second space-time encoders. Each of the four resultant signals form an OFDM block that is transmitted by a respective transmit antenna. Each receive antenna receives a signal that is the superposition of the four transmitted OFDM blocks. When detecting and decoding the coded signal for the first data block, the coded signal for the second data block is treated as an interfering signal. Similarly, the first data block signal is treated as an interfering signal when detecting and decoding the second data block signal. The received signals are pre-whitened prior to maximum likelihood decoding, which can include Viterbi decoding. In one embodiment, pre-whitening for the maximum likelihood decoding includes minimum mean square error (MMSE) restoration of the desired signals followed by whitening of the residual interfering signals and noise.

Successive interference cancellation can improve performance of the system. More particularly, after the first and second data blocks are decoded, it is determined whether the decoded signals contain errors. In the case where one decoded data block has an error and the other data block does not contain an error, the correct data block signal is regenerated and removed from the received signal. The other data block is then re-detected and decoded from the modified signal.

In a further aspect of the invention, a MIMO OFDM system enhances channel parameter estimation by utilizing relatively accurate channel delay profiles derived from the spatial correlation of the channel impulse responses. In general, the estimated channel responses are weighted based upon a deviation from the average channel response. By more heavily weighting relatively accurate channel responses, the channel parameter estimations are more accurate.

BRIEF DESCRIPTION OF THE DRAWINGS

The invention will be more fully understood from the following detailed description taken in conjunction with the accompanying drawings, in which.

DETAILED DESCRIPTION OF THE INVENTION

In general, the present invention provides an orthogonal frequency division multiplexing (OFDM) system having multiple transmit and receive antennas for forming MIMO channels. With this arrangement, channel estimation and signal detection is enhanced.

Figure 1:
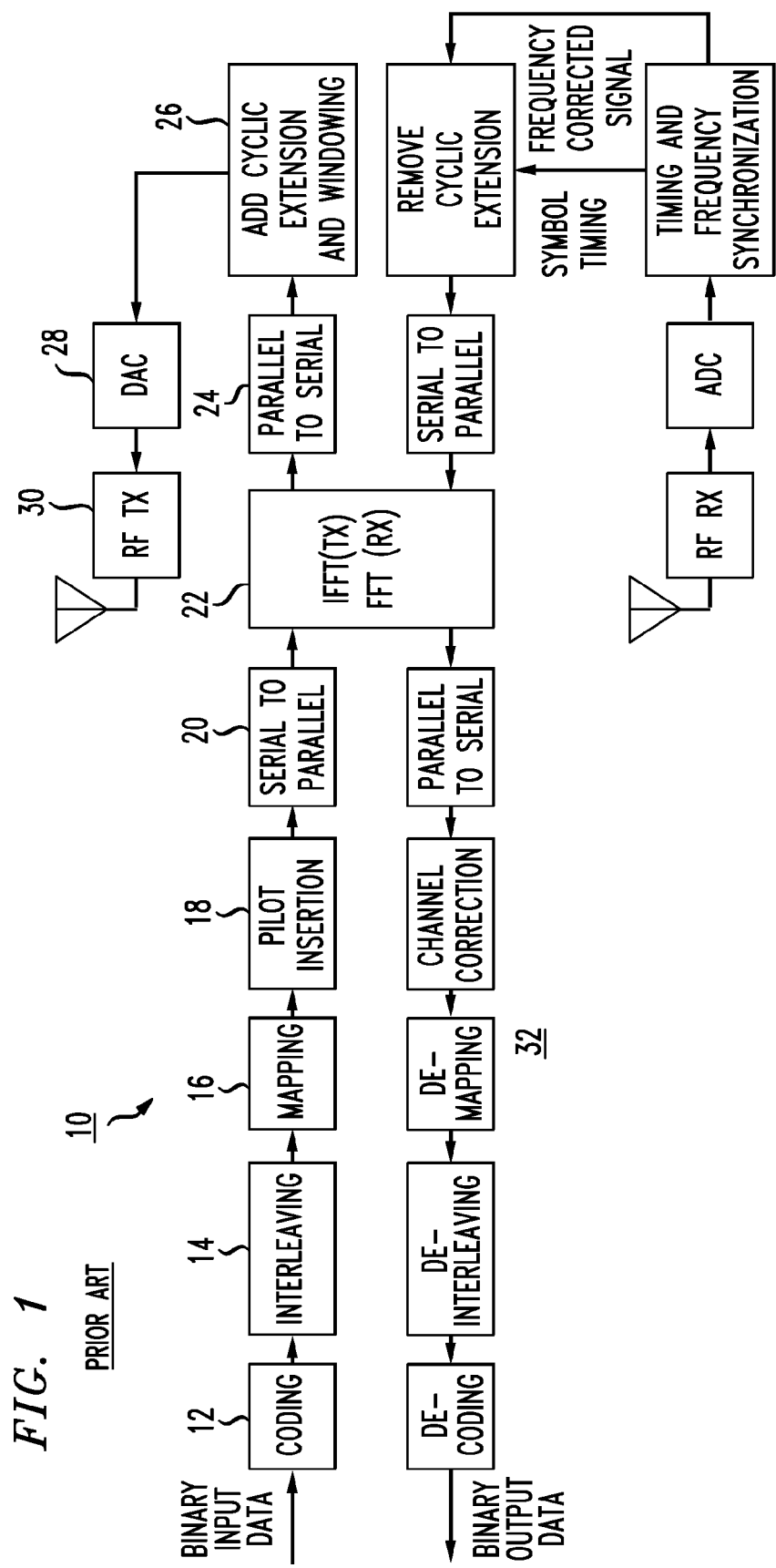
FIG. 1 is a prior art orthogonal frequency division multiplexing (OFDM) system.
Figure 2:
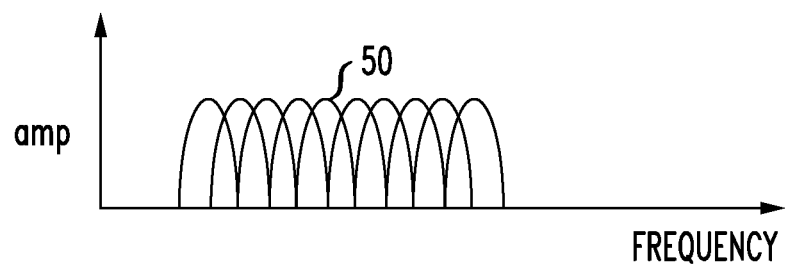
FIG. 2 is a prior art graphical depiction showing subchannels used in the OFDM system of FIG. 1.
Figure 3:
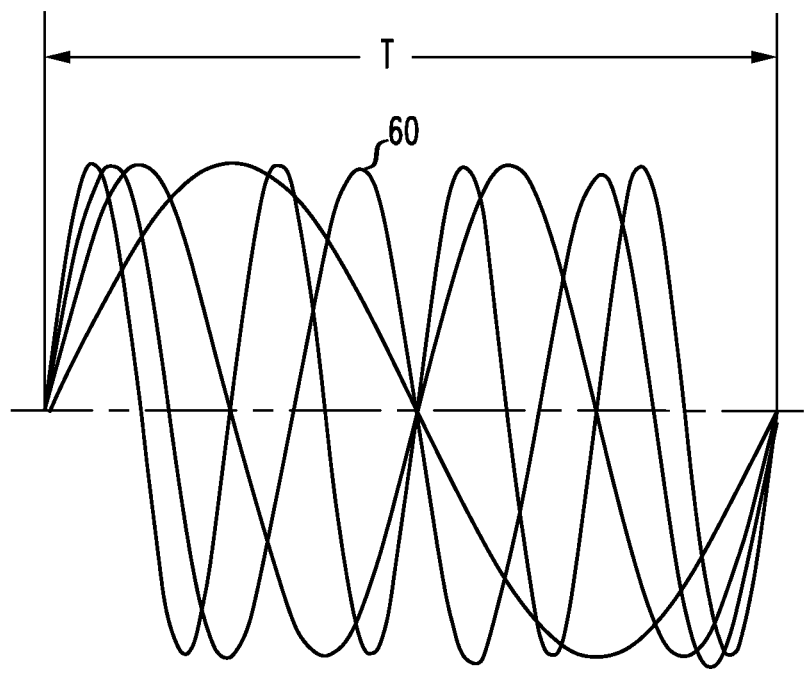
FIG. 3 is a prior art graphical depiction showing orthogonal subcarriers used in the OFDM system of FIG. 1.
Figure 4:
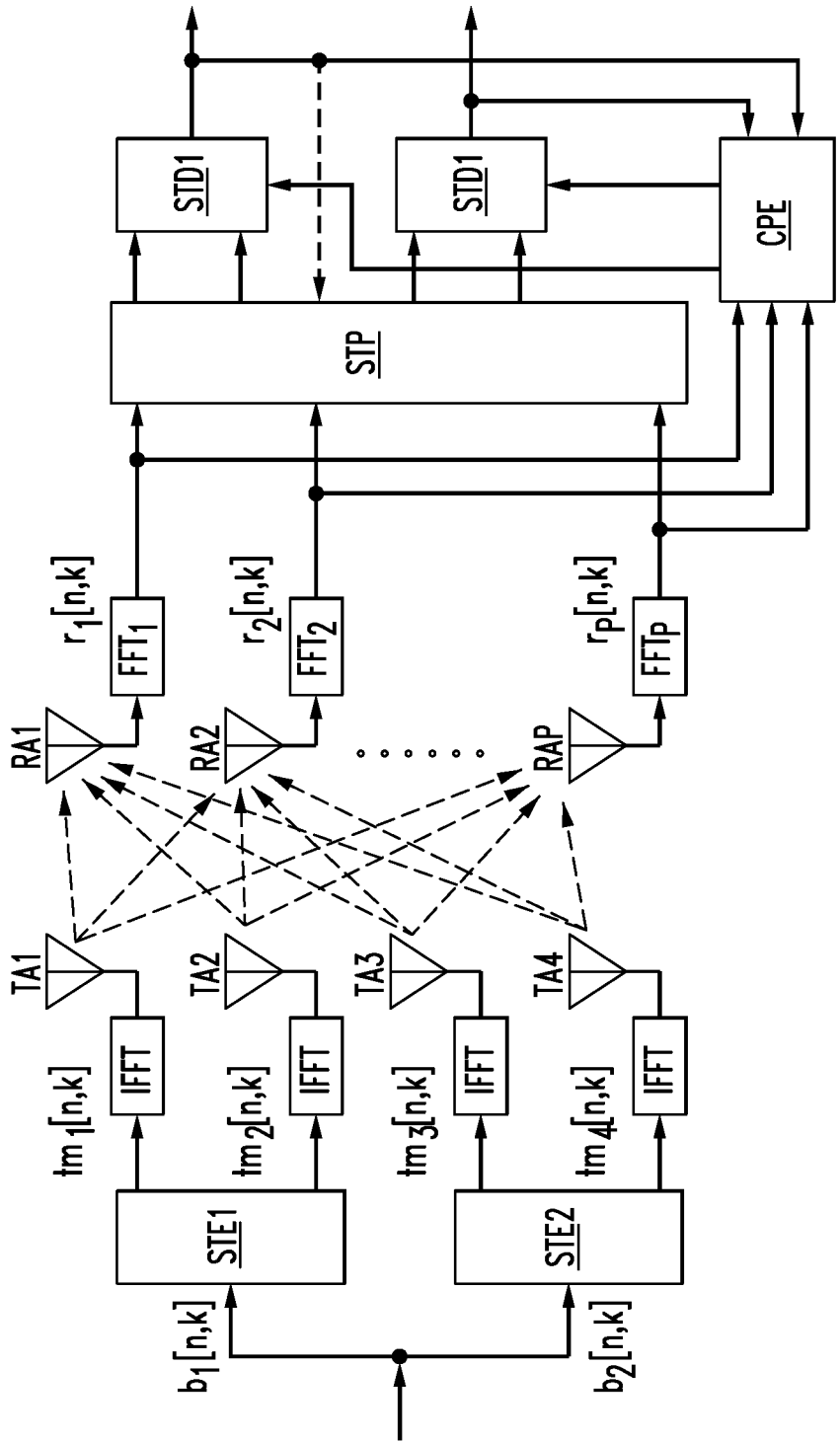
FIG. 4 is a block diagram of a portion of a MIMO-OFDM system in accordance with the present invention.

FIG. 4 shows a MIMO-OFDM system 100 having multiple, here shown as four, transmit antennas TA1-4 and a plurality of receive antennas RA1-P. Although the MIMO-OFDM system is shown having four transmit antennas, it is understood that any number of transmit antennas can be used. In addition, the number of receive antennas should be equal to or greater than the number of transmit antennas.

The MIMO-OFDM system 100 includes a first space time encoder STE1 that receives a first data block $b_1[n,k]$ and a second space-time encoder STE2 that receives a second data block $b_2[n,k]$. At time n at tone k, each of the two data blocks, $\{b_i[n,k]: k=0, 1, \ldots \}$ for i=1 and 2, is transformed into two signals, $\{t_{2i+j}[n,k]: k=0, 1, \ldots, \& j=1, 2\}$ for i=1 and 2, respectively, (Equations 1-3) through the first and second space-time encoders STE1,STE2. Each of the coded signals forms an OFDM block. The transmit antennas TA1-4 transmit the OFDM signals after respective inverse fast Fourier transform IFFT1-4 modulation by respective signals $tm_i[n,k]$ for $i=1, \ldots, 4$.

The signals sent by the transmit antennas TA1-4 are received by the receive antennas RA1-RAP. The received signals $r_1[n,k], r_2[n,k], \ldots, r_P[n,k]$ are transformed by respective fast Fourier transform (FFT) subsystems FFT1-FFTP to generate signals that are provided to a space-time processor STP, which provides detected signal information to respective first and second space-time decoders STD1,STD2. A channel parameter estimator CPE receives the transformed signals from which channel parameter information is determined and then provided to the space-time processor STP for use in decoding the signals.

The received signal at each receive antenna RA1-RAP is the superposition of the four distorted transmitted signals, which can be expressed below in Equation 1:

$$r_j[n, k] = \sum_{i=1}^{4} H_{ij}[n, k] t_i[n, k] + w_j[n, k], \quad \text{Eq. (1)}$$

for $j=1, \ldots, p$, where p corresponds to the number of receive antennas, $H_{ij}[n,k]$ denotes the channel frequency response for the k-th tone at time n, corresponding to the i-th transmit and the j-th receive antenna, and $w_j[n,k]$ denotes the additive complex Gaussian noise on the j-th receive antenna. The noise is assumed to be zero-mean with variance $\sigma_n^2$ and uncorrelated for different times n's, tones k's, and receive antennas j's.

The input-output relationship for the OFDM signals can be also expressed in vector form as set forth in Equation 2-4 below:

$$r[n, k] = H_1[n, k] t_1[n, k] + H_2[n, k] t_2[n, k] + w[n, k], \quad \text{Eq. (2)}$$

where $$r[n, k] \triangleq \begin{pmatrix} r_1[n, k] \\ \vdots \\ r_4[n, k] \end{pmatrix}, \quad w[n, k] \triangleq \begin{pmatrix} w_1[n, k] \\ \vdots \\ w_4[n, k] \end{pmatrix}, \quad \text{Eq. (3)}$$

$$t_i[n, k] \triangleq \begin{pmatrix} t_{2i+1}[n, k] \\ t_{2i+2}[n, k] \end{pmatrix}$$

and $$H_i[n, k] \triangleq \begin{pmatrix} H_{2i+1\,1}[n, k] & H_{2i+2\,1}[n, k] \\ \vdots & \vdots \\ H_{2i+1\,p}[n, k] & H_{2i+2\,p}[n, k] \end{pmatrix} \quad \text{Eq. (4)}$$

To achieve transmit diversity gain and detection of the transmitted signals, the space-time processor STP extracts the required signals for decoding by the first and second space-time decoders STD1, STD2. The space-time processor and space-time decoders each require channel state information.

In one embodiment, the CPE utilizes conventional training sequences to exploit time and frequency domain correlation of the channel parameters. Exemplary channel estimation techniques are described in Y. Li, et al., "Channel Estimation for OFDM Systems with Transmitter Diversity in Mobile Wireless Channels," *IEEE Journal of Selected Areas in Comm.*, Vol. 17, pp. 461-471, March 1999, and Y. Li, "Simplified Channel Estimation for OFDM Systems with Multiple Transmit Antennas," *IEEE Journal of Selected Areas in Comm.*, Vol. 1, Jan., 2002, pp. 67, et seq., which are incorporated herein by reference.

The complex baseband representation of a mobile wireless channel impulse response can be described by Equation 5 below:

$$h(t, \tau) = \sum_k \gamma_k(t) c(\tau - \tau_k) \quad \text{Eq. (5)}$$

where $\tau_k$ is the delay of the k-th path, $\gamma_k(t)$ is the corresponding complex amplitude, and c(t) is a shaping pulse having a frequency response, which can be a square-root raised-cosine Nyquist filter. Due to the motion of the vehicle, the complex amplitudes $\gamma_k(t)$ are wide-sense stationary (WSS), narrow-band complex Gaussian processes, which are independent for each path. The average powers of the complex amplitudes $\gamma_k(t)$ depend on the channel delay profiles, e.g., hilly terrain (HT) and typical urban (TU), which are determined by the environment. The channels typically have the same delay profiles.

From Equation 5 above, it follows that the frequency response at time t can be expressed as set forth below in Equation 6:

$$H(t, f) \triangleq \int_{-\infty}^{+\infty} h(t, \tau) e^{-j2\pi f \tau} d\tau \qquad \text{Eq. (6)}$$
$$= C(f) \sum_k \gamma_k(t) e^{-j2\pi f \tau_k},$$

where $$C(f) \triangleq \int_{-\infty}^{+\infty} c(\tau) e^{-j2\pi f \tau} d\tau \qquad \text{Eq. (7)}$$

In an OFDM system with proper cyclic extension and timing, the channel frequency response, with tolerable leakage, can be represented by Equation 8 below:

$$H[n, k] \triangleq H(nT_f, k\Delta f) = \sum_{l=0}^{K_0-1} h[n, l] W_K^{kl}, \qquad \text{Eq. (8)}$$

where the channel response is $$h[n, l] \triangleq h\left(nT_f, k\frac{T_s}{K}\right),\ W_K = \exp\left(-j\frac{2\pi}{K}\right),$$

K is the number of tones in an OFDM block, $T_f$ and $\Delta f$ are the block length and tone spacing, respectively, and $T_s$ is the symbol duration of OFDM, which is related to $\Delta f$ by $T_s = 1/\Delta f$. The channel responses h[n,1], for l=0, 1, . . . , $K_0$-1, are WSS, narrow-band complex Gaussian processes. The average power of the channel h[n,l] and index $K_0$(<K) depend on the delay profiles, e.g., HT and TU, of the wireless channels.

In accordance with the present invention, signal detection is enhanced by utilizing spatial pre-whitening followed by maximum-likelihood (ML) decoding. While joint detection of multiple inputs may be optimal, the concomitant computational complexity renders such an approach impractical.

In contrast to joint detection, in accordance with the present invention the coded signals for the second data block $b_2[n,k]$ are treated as interfering signals when detecting and decoding the first data block $b_1[n,k]$ signals. Similarly, the coded signals for the first data block $b_1[n,k]$ are treated as interfering signals when detecting and decoding the second data block $b_2[n,k]$. In addition, the transmitted signals are considered to be uncorrelated and Gaussian processes.

For example, the second data block signal $b_2[n,k]$, which is transmitted by the third and fourth transmit antennas TA3, TA4, is treated as an interfering signal when detecting and decoding the first data block $b_1[n,k]$. Therefore, the interfering signal v[n, k] at the receivers is equal to the channel response vector $H_2[n,k]$ multiplied by the transmitted signal vector $t_2[n,k]$ for the interfering signal plus Gaussian noise w[n,k] as set forth below in Equation 9:

$$v[n, k] = H_2[n, k] t_2[n, k] + w(n, k) \qquad \text{Eq. (9)}$$

The vectors in Equation 9 are derived from Equations 2-4 above.

If v[n, k] is spatially and temporally white, then the minimum Euclidian distance decoder is equivalent to maximum likelihood (ML) decoder. However, if v[n,k] is spatially or temporally correlated, then pre-whitening is used for the ML decoder. Pre-whitening for ML decoding is well known to one of ordinary skill in the art and is described below. In general, the space-time codes for the first and second data blocks are decoded using pre-whitening for flattening the receiver response to facilitate ML detection. The detected constellation points are mapped to the sequence nearest in Euclidean distance.

From the ML criterion, ML decoding is equivalent to finding the estimated first data block $\{\hat{b}_1[n,k]$ that minimizes the value of Equation 10 below:

$$C(\{b_1[n, k]\}) = \sum_{k=1}^{K} m[n, k]. \qquad \text{Eq. (10)}$$

where the minimum Euclidean distance is defined in Equations 11-12 below:

$$m[n, k] \triangleq (r[n, k] - H_1[n, k] t_1[n, k])^H R_v^{-1}[n, k](r[n, k] - H_1[n, k] t_1[n, k]) \qquad \text{Eq. (11)}$$

and $$R_v[n, k] \triangleq E\{v[n, k] v^H[n, k]\} = H_2[n, k] H_2^H[n, k] + \sigma_n^2 I \qquad \text{Eq. (12)}$$

As known to one of ordinary skill in the art, the inverse of the matrix $R_v[n,k]$, which is derived from the cross correlation $H_2[n,k] H_2^H[n,k]$ of the interfering channel response, can be used to whiten the signal.

Direct calculation then yields that the minimum Euclidean distance can be defined as set forth in Equation 13

$$m[n, k] = \qquad \text{Eq. (13)}$$
$$r^H[n, k] R_v^{-1}[n, k] r[n, k] - t_1^H[n, k] H_1^H[n, k] R_v^{-1}[n, k] r[n, k] -$$
$$r^H[n, k] R_v^{-1}[n, k] H_1[n, k] t_1[n, k] +$$
$$t_1^H[n, k] H_1^H[n, k] R_v^{-1}[n, k] H_1[n, k] t_1[n, k].$$

Denoting $\tilde{H}[n,k]$ as a two by two matrix satisfying Equation 14 and 15

$$H_1^H[n, k] R_v^{-1}[n, k] \triangleq \tilde{H}^H[n, k] \tilde{H}[n, k] \qquad \text{Eq. (14)}$$

and $$L_1[n, k] \triangleq (H_1 \tilde{H}_1^{-1})^H R_v^{-1}[n, k]. \qquad \text{Eq. (15)}$$

it then follows that the minimum Euclidean distance can be represented in Equation 16

$$m[n, k] = r^H[n, k] R_v^{-1}[n, k] r[n, k] - \qquad \text{Eq. 16}$$
$$t_1^H[n, k] \overline{H}_1^H[n, k] L_1[n, k] r[n, k] -$$
$$r^H[n, k] L_1^H[n, k] \overline{H}_1[n, k] t_1[n, k] +$$
$$t_1^H[n, k] \overline{H}_1^H[n, k] \overline{H}_1[n, k] t_1[n, k]$$
$$= r^H[n, k] R_v^{-1}[n, k] r[n, k] -$$
$$t_1^H[n, k] \overline{H}_1^H[n, k] \tilde{r}_1[n, k] -$$
$$\tilde{r}_1^H[n, k] \overline{H}_1[n, k] t_1[n, k] +$$
$$t_1^H[n, k] \overline{H}_1^H[n, k] \overline{H}_1[n, k] t_1[n, k]$$
$$= r^H[n, k] R_v^{-1}[n, k] r[n, k] - \tilde{r}_1^H[n, k] \tilde{r}_1[n, k] +$$
$$\|\tilde{r}_1[n, k] - \overline{H}_1[n, k] t_1[n, k]\|^2,$$

where $$\tilde{r}_1[n, k] \triangleq L_1[n, k]r[n, k].$$ Eq. (17)

When the well known Viterbi algorithm is used for the ML decoding of the space-time codes, the first two terms in the above equation for m[n,k] are independent of the detected data and only the third term, i.e., $\|\tilde{r}_1[n, k] - \tilde{H}_1[n, k]t_1[n, k]\|^2$, is related to the detected data and affects the metric in the trellis search when the Viterbi algorithm is used. Trellis searching is well known to one of ordinary skill in the art. Therefore, the ML decoding is equivalent to finding the estimated first data block $\{\hat{b}_1[n, k]$ that minimizes the value of Equation 18 below:

$$\overline{C}(\{b_1[n, k]\}) = \sum_{k=1}^{K} \|\tilde{r}_1[n, k] - \overline{H}_1[n, k]t_1[n, k]\|^2$$ Eq. (18)

Thus, after pre-whitening, a conventional space-time decoder for a 2-transmit and 2-receive antenna system can be used.

Note that $L_1[n,k]$ can be rewritten as shown in Equation 19:

$$L_1[n, k] = (\tilde{H}^{-1}[n, k])^H H_1^H[n, k] R_v^{-1}[n, k].$$ Eq. (19)

A predetermined weight matrix $H_1^H[n, k]R_v^{-1}[n, k]$ for minimum mean-square error (MMSE) restoration of the desired signal $t_1[n,k]$ suppresses the interfering signal $t_2[n,k]$. After MMSE signal restoration, the correlation matrix of the residual interferers and noise can be represented as set forth in Equation 20:

$$E\{H_1^H[n, k]R_v^{-1}[n, k]v[n, k](H_1^H[n, k]R_v^{-1}[n, k]v[n, k])^H\} = H_1^H[n, k]R_v^{-1}[n, k]H_1[n, k].$$

The term $\tilde{H}^{-1}[n, k]^H$ whitens the residual interferers and noise. Therefore, the pre-whitening processing for the ML decoder includes MMSE restoration of the desired signals followed by whitening of the residual interferers and noise.

In another aspect of the invention, successive interference cancellation is utilized to improve the overall system performance. The successive interference cancellation can be based upon cyclic redundancy check (CRC) codes and/or signal quality.

In one embodiment, a MIMO-OFDM system includes successive interference cancellation based upon CRC codes for identifying decoding errors. First and second data blocks $b_1[n,k]$, $b_2[n,k]$ can be decoded as described above. If an error is detected in one of the data blocks, such as the first data block $b_1[n,k]$, and no errors are detected in the other data block, such as the second data block $b_2[n,k]$, then the coded signals for the correct (second) data block are regenerated at the receiver and removed from the received signal. That is, the coded signals for second data block $b_2[n,k]$ are removed from the received signal such that cleaner signals can be used to re-detect and decode the first data block $b_1[n,k]$, which originally contained an error. More particularly, the first data block can be re-detected and decoded without interference from the second data block signals.

In a further embodiment, a MIMO-OFDM system detects and decodes each of the data block signals, which do not include error codes such as CRC codes. As is known to one of ordinary skill in the art, some systems do not utilize error coding when signal quality is expected to be above a predetermined threshold. In accordance with the present invention, each decoded signal has an associated MMSE. The signal with the higher quality, e.g., lower MMSE, is removed such that it does not interference with the other signal.

In another aspect of the invention, a MIMO-OFDM system includes enhanced channel parameter estimation using relatively accurate channel delay profiles. In one embodiment, a known decision-directed channel parameter estimator along with optimum training sequences for OFDM systems with multiple transmit antennas are used to estimate the channel delay profiles. Illustrative parameter estimations and training sequences are described in Y. (Geoffrey) Li, et al. "Channel Estimation for OFDM Systems with Transmitter Diversity and its Impact on High-Rate Data Wireless Networks," *IEEE Journal of Selected Areas in Comm.*, Vol. 17, pp. 461-471, March 1999, and Y. Li, et al., "Simplified Channel Estimation for OFDM Systems with Multiple Transmit Antennas," mentioned above. The estimated channel delay profiles are used to determine channel parameter estimations.

In general, the time and frequency correlation of the channel profiles are used to more accurately estimate the channel parameter estimation. More particularly, channel profiles are correlated in time since the change over time is relatively slow. Similarly, adjacent channels have similar frequency responses and are thus correlated with respect to frequency. By determining the average channel impulse response for example, a deviation from the average can form the basis to weight each channel impulse response. With this weighting arrangement, the channel delay estimates can be more accurately estimated to enhance channel parameter estimation.

The channel impulse response $h_{ij}[n,l]$ can be estimated using the correlation of channel parameters in the time and frequency domains. The estimated channel impulse response $\hat{h}_{ij}[n,l]$ can be reconstructed using a discrete Fourier transform (DFT) as shown below in Equation 21

$$\hat{H}_{ij}[n, k] = \sum_{l=0}^{K_o-1} \hat{h}_{ij}[n, l]W_K^{kl}$$ Eq. (21)

where $\hat{h}_{ij}[n,l]$ contains the true channel parameter $h_{ij}[n,l]$, $W_k^{kl}$ is described above in Equation 5, and an estimation error $e_{ij}[n,l]$ as expressed below in Equation 22:

$$\hat{h}_{ij}[n, l] = h_{ij}[n, l] + e_{ij}[n, l]$$ Eq. (22)

The estimation error $e_{ij}[n,l]$ can be Gaussian with zero-mean and variance $\sigma^2$. The parameter estimation quality can be measured with a normalized MSE (NMSE) defined as follows in Equation 23:

$$NMSE \triangleq \frac{E\|\hat{H}_{ij}[n, k] - H_{ij}[n, k]\|^2}{E\|H_{ij}[n, k]\|^2}$$ Eq. (23)

Thus, the NMSE for the channel response can be expressed as set forth in Equation 24:

$$NMSE_r = K_o \sigma^2$$ Eq. (24)

assuming that the NMSE is normalized as shown in Equation 25:

$$\sum_{l=0}^{K_o-1} E\|h_{ij}[n, l]\|^2 = \sum_{l=0}^{K_o-1} \sigma_l^2 = 1$$ Eq. (25)

with $\sigma_l^2 \triangleq E\|h_{ij}[n, l]\|^2$.

If the channel delay profile is known, that is, $\sigma_l^2$ for $l = 0, \ldots, K_0-1$ is known, and is used to reconstruct channel frequency response from $\hat{h}_{ij}[n,1]$, the MSE of $\hat{H}_{ij}[n,k]$, can be significantly reduced. In this case, if weighting factors $\alpha_l$'s are selected to minimize the NMSE of the estimated channel response as in Equation 26:

$$\hat{H}_{ij}[n,k] \triangleq \sum_{l=0}^{K_o-1} \alpha_l \hat{h}_{ij}[n,l] W_K^{kl} \quad \text{Eq. (26)}$$

then the optimal weighting factor $\alpha_l$ can be defined in Equation 27:

$$\alpha_l = \frac{\frac{\sigma_l^2}{\sigma_l^2 + \sigma^2}}{\sum_{m=0}^{K_o-1} \frac{\sigma_m^4}{\sigma_m^2 + \sigma^2}} \quad \text{Eq. (27)}$$

which can also be expressed as an inverse of the sum of one plus a ratio of noise power to a power of channel response estimates averaged over the receive antennas, i.e., $$\frac{1}{1 + \frac{\sigma^2}{\sigma_l^2}}$$

and the resultant NMSE is expressed in Equation 28:

$$NMSE_o = \frac{\sigma^2 \sum_{m=0}^{K_o-1} \frac{\sigma_m^2}{\sigma_m^2 + \sigma^2}}{\sum_{m=0}^{K_o-1} \frac{\sigma_m^4}{\sigma_m^2 + \sigma^2}} \quad \text{Eq. (28)}$$

Channel delay profiles depend upon the environment and therefore are usually unknown to users of the system. However, for MIMO-OFDM systems, channels corresponding to different transmit or receive antennas should have the same delay profiles. Thus, $\sigma_l^2 = E\|h_{ij}[n,1]\|^2$ can be estimated by averaging the estimated channel impulse response for the channels formed by the four transmit antennas and the p receive antennas as shown below in Equation 29:

$$\hat{\sigma}_l^2 = \frac{1}{4p} \sum_{i=1}^{4} \sum_{j=1}^{p} |\hat{h}_{ij}[n,l]|^2. \quad \text{Eq. (29)}$$

With the estimated variance, channel delay profile estimates are more accurate so as to improve channel parameter estimation.

EXAMPLE

An exemplary MIMO-OFDM system in accordance with the present invention was simulated. The known typical urban (TU) and hilly terrain (HT) delay profiles were used with Doppler frequencies of 5, 40, 100, and 200 Hz, respectively. The channels corresponding to different transmit or receive antennas have the same statistics. Four transmit antennas and different numbers of receive antennas were used to form a 4-input multiple-output OFDM systems.

To construct an OFDM signal, the entire channel bandwidth, 1.25 MHz, is divided into 256 subchannels. The 2 subchannels on each end are used as guard tones, and the remaining (252 tones) are used to transmit data. To make the tones orthogonal to each other, the symbol duration is about 204.8 microseconds. An additional 20.2 microseconds guard interval is used to provide protection from intersymbol interference due to channel multipath delay spread. This results in a total block length $T_f$ of about 225 microseconds and a subchannel symbol rate $r_b$ of 4.44 kbaud.

A 16-state space-time code with 4-PSK is used. Each data block, containing 500 bits, is coded into two different blocks, each of which has exactly 252 symbols, to form an OFDM block. Therefore, the OFDM system with 4 transmit antennas can transmit 2 space-time codewords (1000 bits in total). Each time slot includes 10 OFDM blocks, with the first block used for training and the remaining nine blocks used for data transmission. Thus, the system can transmit data at a rate of 4 Mbits/sec over a 1.25 MHz channel, i.e., the transmission efficiency is 3.2 bits/sec/Hz.

Figure 5A:
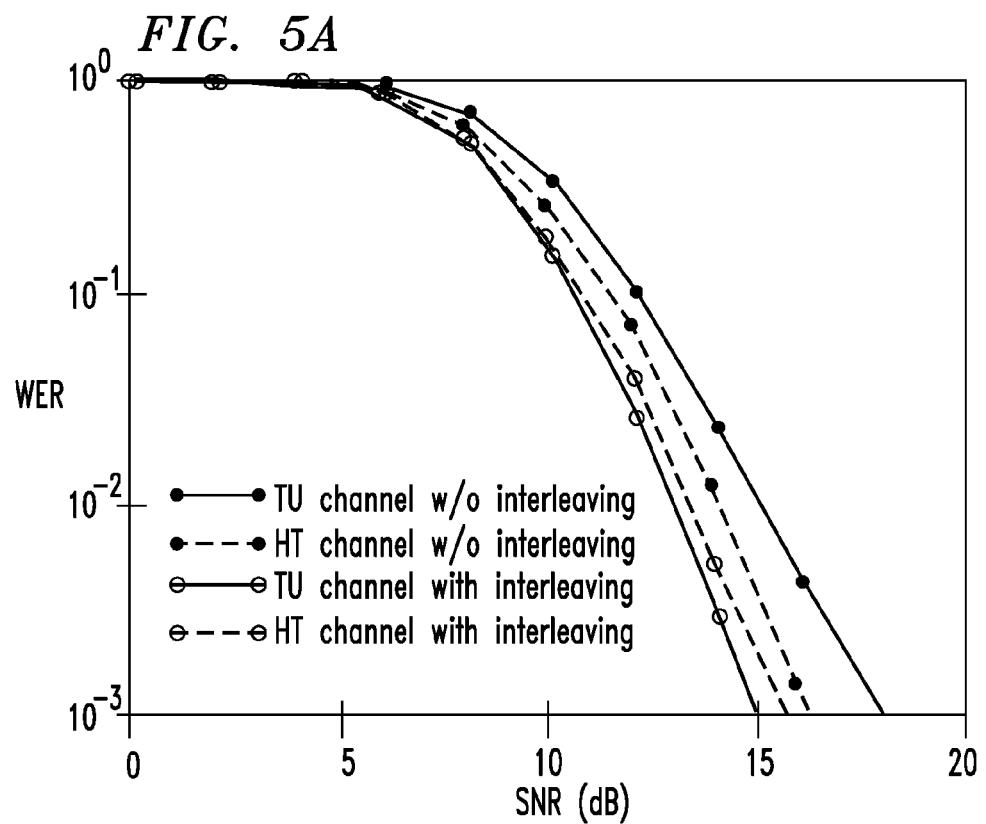
FIGS. 5A-6B are graphical representations of MIMO-OFDM systems in accordance with the present invention having various channel delay profiles, numbers of receive antennas, and detection techniques.

FIGS. 5A-6B show the simulated performance of MIMO-OFDM systems in accordance with the present invention with different channel delay profiles, numbers of receive antennas, and detection techniques. FIG. 5A demonstrates the effect of interleaving on the performance improvement. By interleaving, the required SNR for a 10% WER is improved by 1.5 dB for the TU channel and by 0.7 dB for the HT channel. Since the HT channel has more diversity than the TU channel before interleaving, interleaving has less gain for the HT channel than for the TU channel.

Figure 5B:
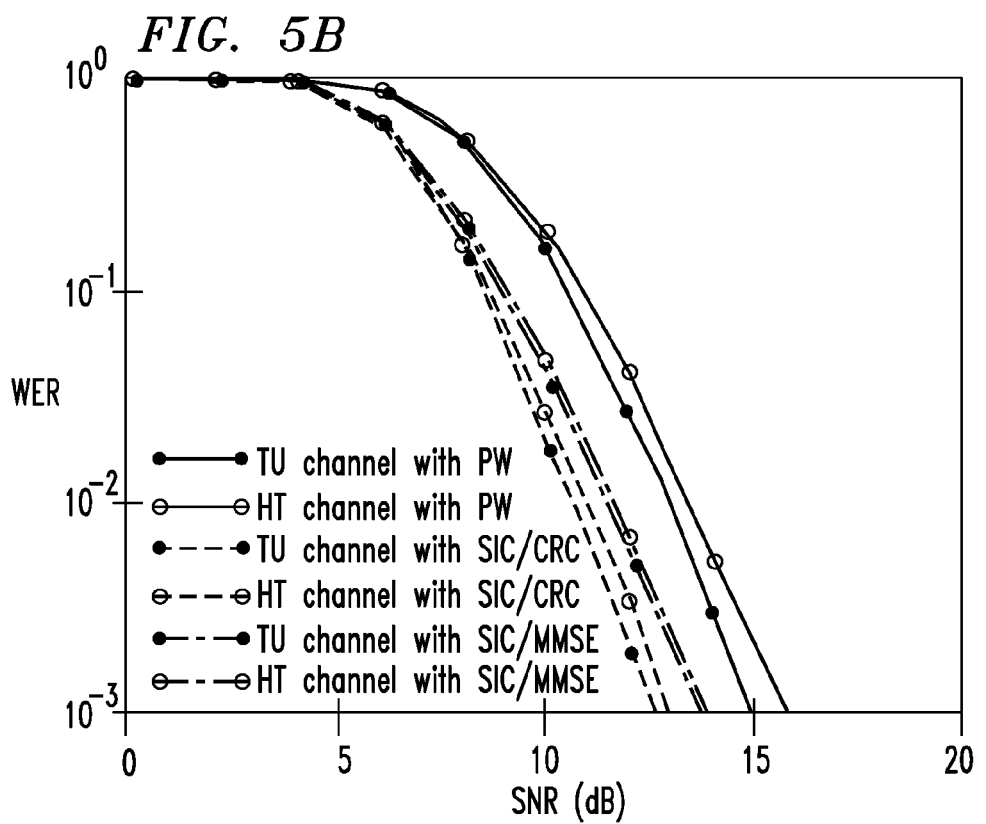
Figure 6A:
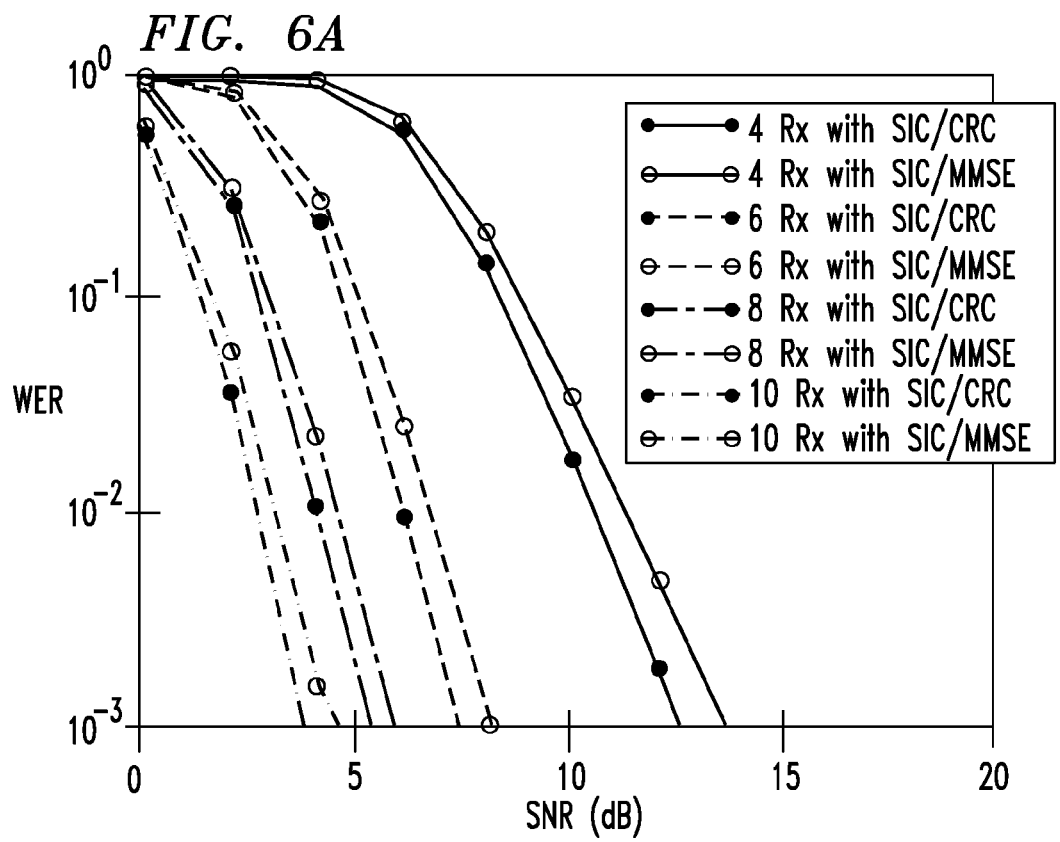
Figure 6B:
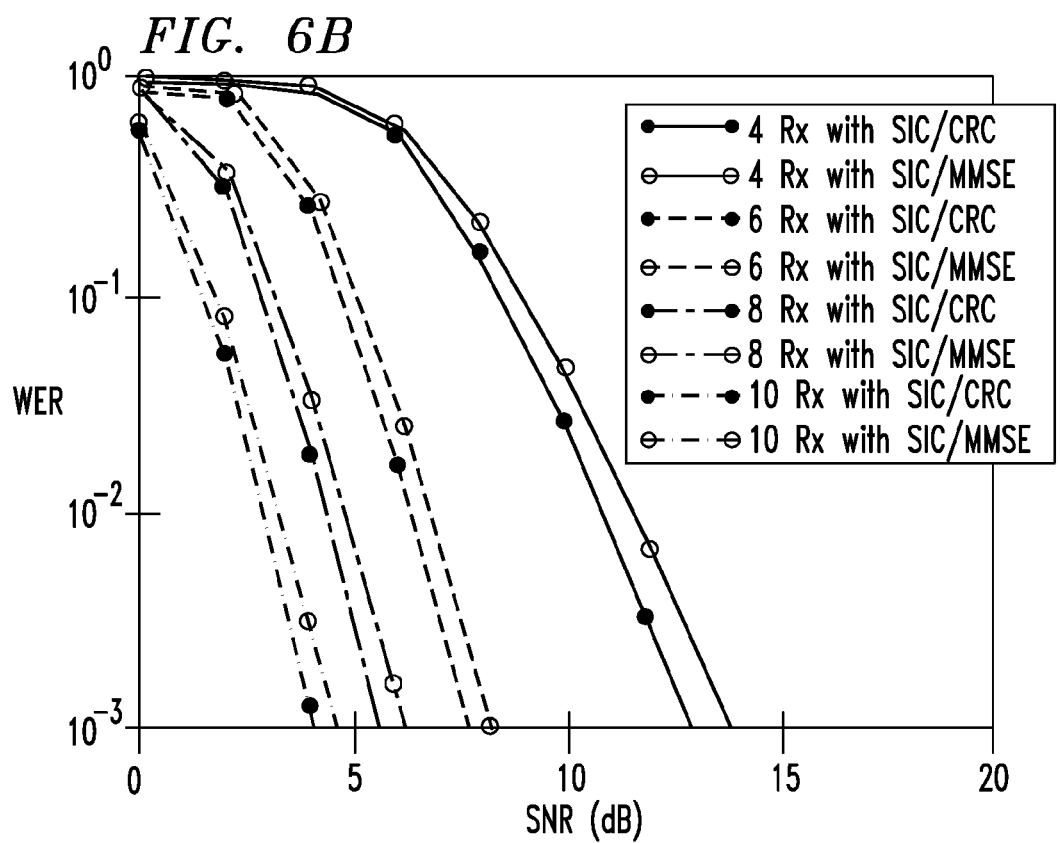

FIG. 6A-B compare the WERs of a system with interleaving for different detection techniques. As shown, the system with successive interference cancellation based on CRC and signal quality (MMSE) can reduce the required WERs for a 10% WER by 2.5 and 1.8 dB, respectively. All the performance curves in FIGS. 5A-5B are for OFDM with 4 transmit and 4 receive antennas. As the number of receive antennas increases, performance improves, as can be seen from FIG. 6A-6B. In particular, if the receive antenna number is increased from 4 to 6, the OFDM system with either the TU or HT channels will have about 4 dB performance improvement.

Figure 7A:
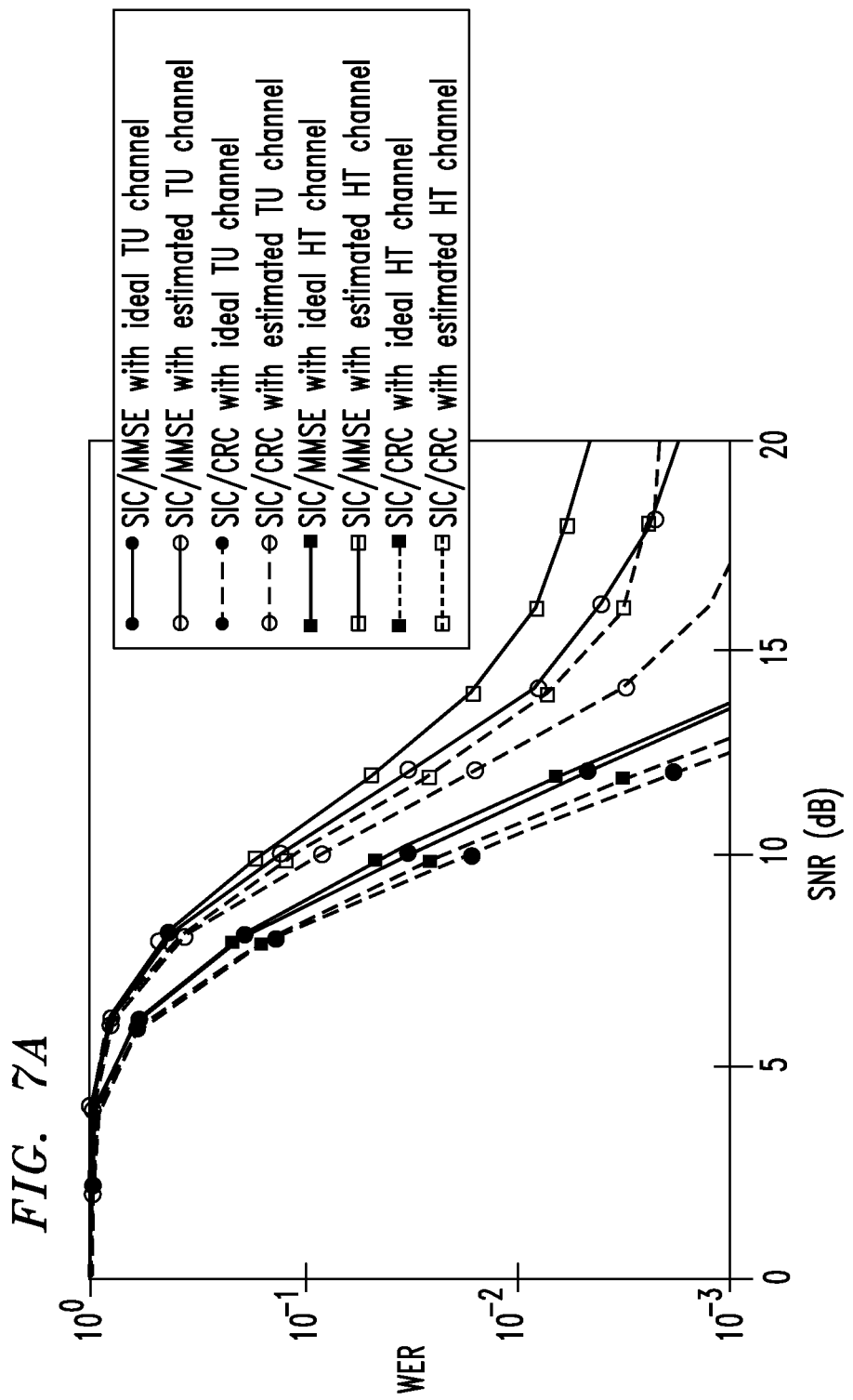
FIGS. 7A-B are graphical comparisons of MIMO-OFDM systems in accordance with the present invention with ideal and estimated channel parameters.
Figure 7B:
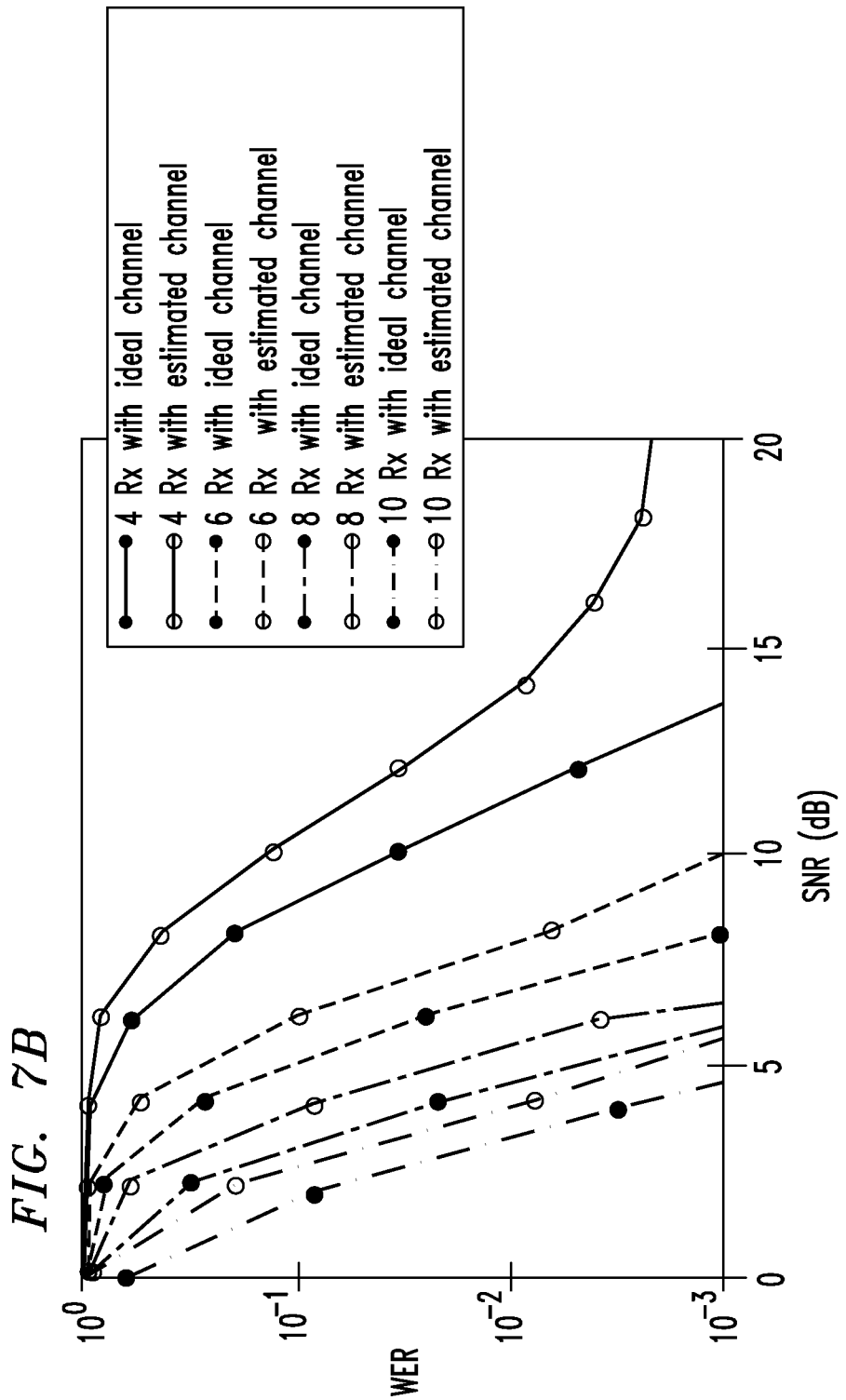
Figure 8A:
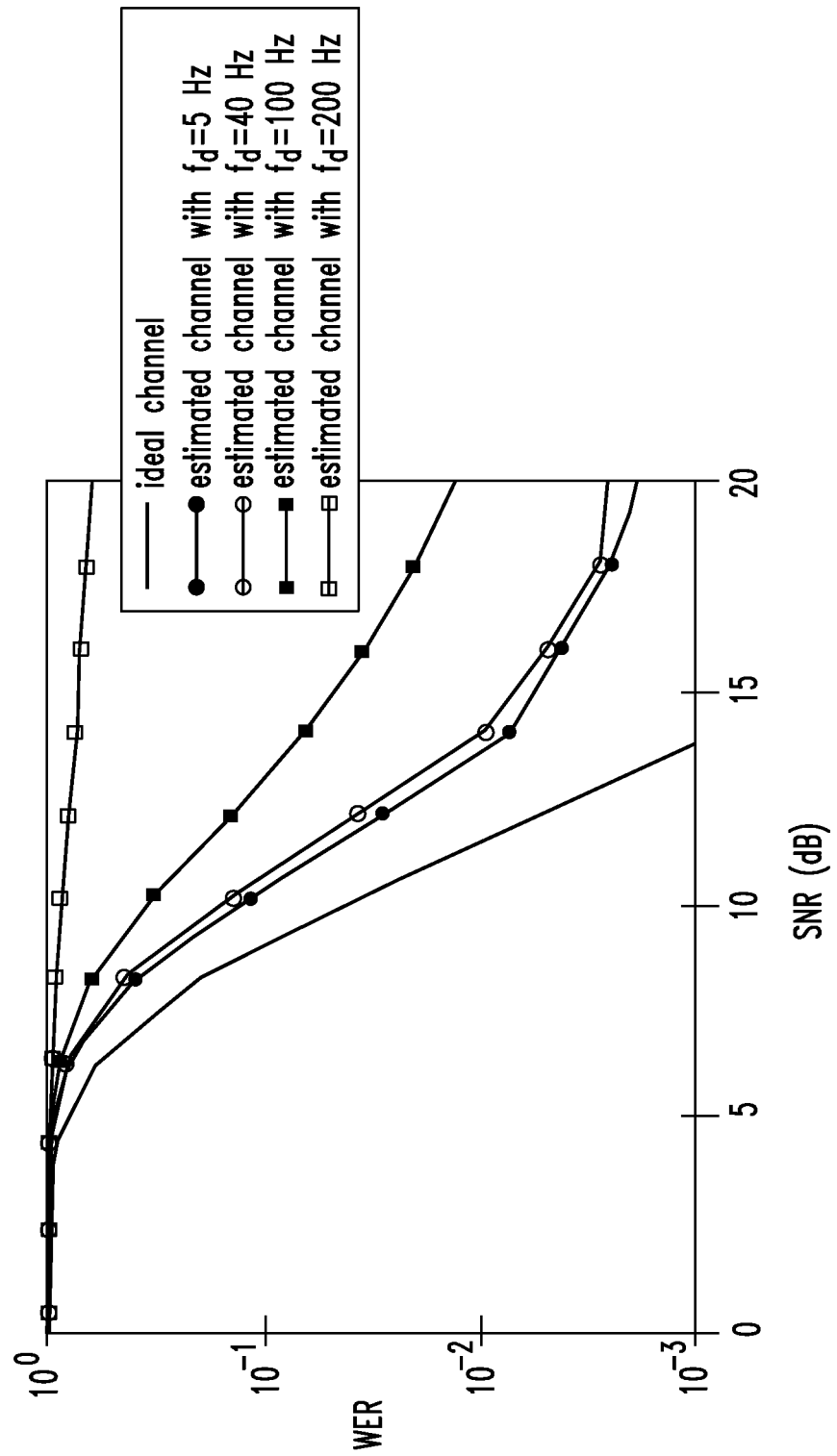
FIGS. 8A-D are graphical representations of MIMO-OFDM systems in accordance with the present invention with various Doppler frequencies.
Figure 8B:
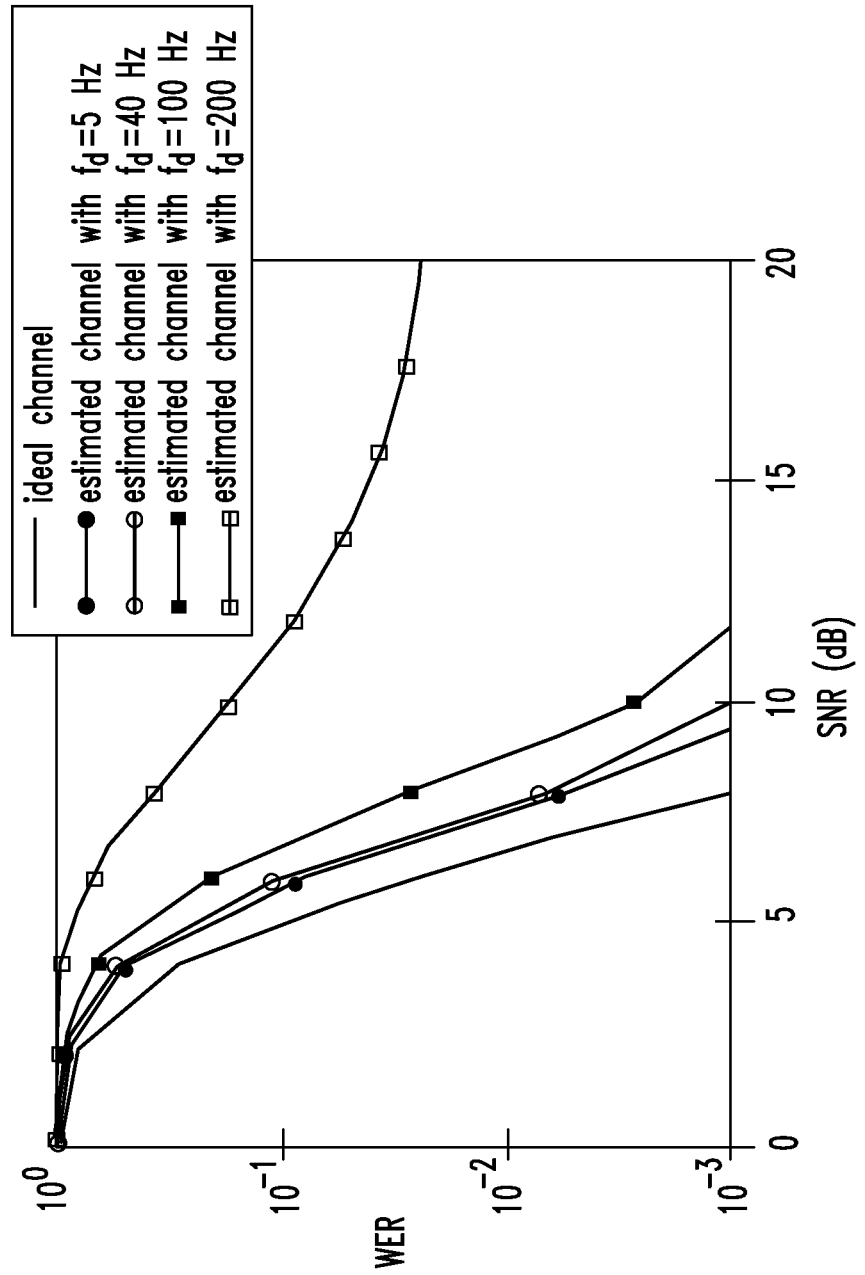
Figure 8C:
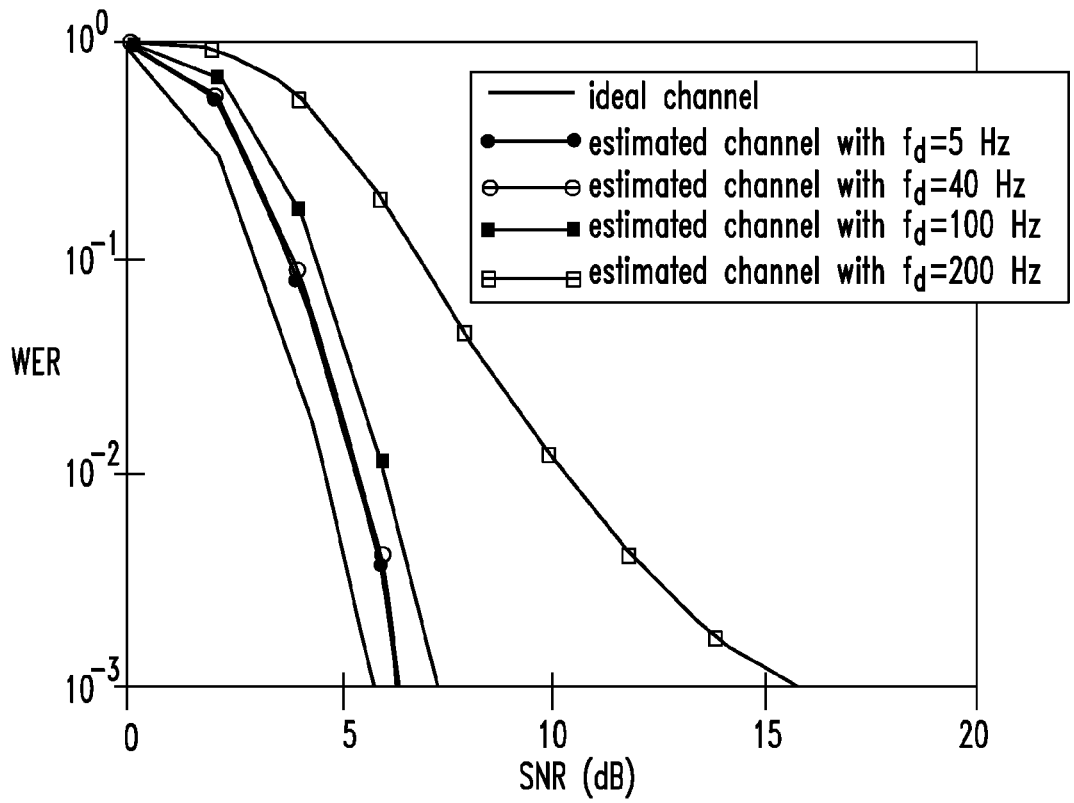
Figure 8D:
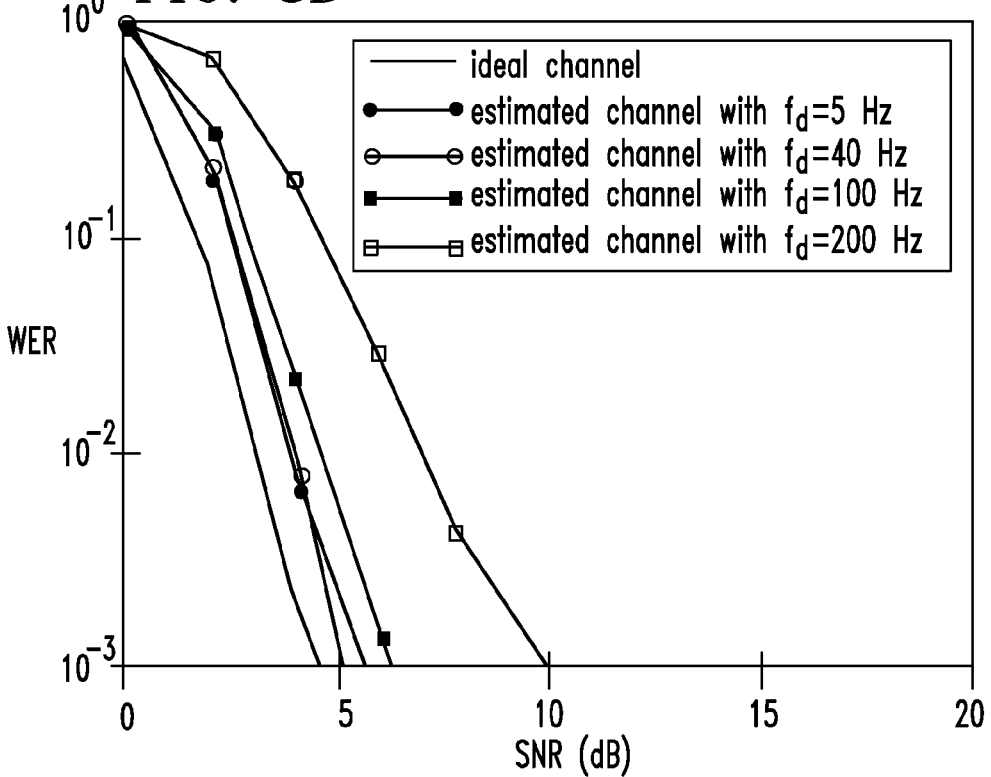

FIGS. 7A-7B compare the performance of MIMO-OFDM systems with the ideal or the estimated channel parameters for different channels with a 40 Hz Doppler frequency. From FIG. 7A it can be seen that the required SNRs for a 10% WER are 10-11 dB for a MIMO-OFDM system with estimated channel parameters for successive interference suppression and space-time decoding, which is 1.5-2 dB higher than with ideal channel parameters for signal detection and decoding. With additional receive antennas, performance improves, as shown in FIG. 7B. In particular, for a system with estimated channel parameters, the required SNR for a 10% WER is reduced by 4.5 dB and 2 dB when the number of receive antennas is increased from 4 to 6 and 6 to 8, respectively.

FIGS. 8A-D compare the performance of OFDM systems with different Doppler frequencies. As the Doppler frequency becomes higher, the channel estimation error increases, and therefore the system suffers more degradation. For a MIMO-OFDM system with 4 transmit and 4 receive antennas, the required SNR for a 10% WER is degraded by 2.4 dB when the Doppler frequency is increased from 40 Hz to 100 Hz. However, with more receive antenna numbers, the degradation is reduced. The degradation is only about 0.4 dB with 10 receive antennas.

The present invention provides an OFDM system having multiple transmit and receive antennas to form a multiple-input multiple-output (MIMO) system that increases system capacity. A pre-whitening technique for ML decoding and successive interference cancellation technique are disclosed. Using these techniques in a four input/four output OFDM system, the net data transmission rate can reach 4 Mbits/sec over a 1.25 MHz wireless channel with a 10-12 dB SNR required for a 10% WER, depending on the radio environment and signal detection technique for word lengths up to 500 bits. A MIMO-OFDM system in accordance with the present invention can be effectively used in high data-rate wireless systems One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A receiver constructed to receive signals from a remote unit that at time n transmits a data block $b_i[n,k]$ over two transmit antennas and transmits a data block $b_2[n,k]$ over two other transmit antennas, where k is a tone and k=0, 1, 2, ..., comprising:
    N receive antennas, each receiving a signal that includes signals related to the signals transmitted by the transmit antennas of the remote unit, where N is equal or greater than 4;
    N fast Fourier transform (FFT) modules, each coupled to an associated one of said receive antennas;
    a space-time processing (STP) unit, responsive to said FFT modules, to pre-whiten signals supplied to said STP unit and to perform maximum likelihood detection on each of the pre-whitened signals, and which, when initially detecting data pertaining to block $b_1[n,k]$ treats other received signals, including signals received from the antennas that transmit data pertaining to block $b_2[n,k]$, as interfering noise, and when initially detecting data pertaining to block $b_2[n,k]$ treats other received signals, including signals received from the antennas that transmit data pertaining to block $b_1[n,k]$, as interfering noise;
    a first space-time decoder responsive to output signals of said STP unit for decoding block $b_1[n,k]$;
    a second space-time decoder responsive to output signals of said STP unit for decoding block $b_2[n,k]$; and
    a channel parameter estimator responsive to output signals of said FFT modules and output signals of said space-time decoders, for developing parameter estimates of channels between the remote unit and the receiver, and applying the developed parameter estimates to said space-time decoders.

2. The receiver of claim 1 where estimates of channel delay profiles are used to determine said parameter estimates.

3. The receiver of claim 1 further comprising a feedback signal path from at least one of the space-time decoders to said STP unit, which enables said STP unit to modify results of said maximum likelihood detection based on signals supplied by said feedback signal path.

4. The receiver of claim 1 further comprising: a feedback signal path from at least one of the space-time decoders to said STP unit; and when
    (a) initial detecting by said STP unit of data pertaining to block $b_1[n,k]$ and data pertaining to block $b_2[n,k]$ is completed,
    (b) said first and second space time decoders responsively form decoded data blocks $b_1[n,k]$ and $b_2[n,k]$, respectively, and
    (c) if it is determined that an error exists in decoded data block $b_1[n,k]$ and no error is detected in decoded data block $b_2[n,k]$, said STP unit
        (i) encodes the decoded data block $b_2[n,k]$, which is received via said feedback path,
        (ii) removes the encoded data block from the signals received by said STP unit from said FFT modules, to form modified signals, and
        (iii) responsive to the modified signals, detects data pertaining to block $b_1[n,k]$ and data pertaining to block $b_2[n,k]$.

5. A method comprising:
    at each of N receive antennas, receiving a signal that includes signals related to signals transmitted from a remote unit at time n, the signals including a data block $b_1[n,k]$ transmitted over first transmit antennas and a data block $b_2[n,k]$ transmitted over second transmit antennas, where k is a tone and k=0, 1, 2, ..., where N is equal or greater than 4;
    transforming the received signal in N fast Fourier transform (FFT) modules coupled to an associated one of said receive antennas and generating respective transformed signals;
    receiving the transformed signals at a space-time processing unit and pre-whitening signals in the space-time processing unit associated with the data blocks $b_1[n,k]$ and $b_2[n,k]$ and performing maximum likelihood detection on each of the pre-whitened signals, and when initially detecting data pertaining to block $b_1[n,k]$ treating other received signals, including signals received from the second transmit antennas that transmit data pertaining to block $b_2[n,k]$, as interfering noise, and when initially detecting data pertaining to block $b_2[n,k]$ treating other received signals, including signals received from the first transmit antennas that transmit data pertaining to block $b_1[n,k]$, as interfering noise;
    decoding block $b_1[n,k]$ in a first space-time decoder;
    decoding block $b_2[n,k]$ in a second space-time decoder;
    developing channel parameter estimates using output signals of said FFT modules and output signals of said space-time decoders; and
    using the channel parameter estimates in said first and second space-time decoders.

6. The method of claim 5 further comprising using estimates of channel delay profiles to determine said channel parameter estimates.

7. The method of claim 5 further comprising modifying results of said maximum likelihood detection based on signals from at least one of the space-time decoders.

8. The method of claim 5 further comprising:
    said first and second space time decoders forming decoded data blocks $b_1[n,k]$ and $b_2[n,k]$, respectively, responsive to completion of initial detecting by said STP unit of data pertaining to block $b_1[n,k]$ and data pertaining to block $b_2[n,k]$;
    if it is determined that an error exists in decoded data block $b_1[n,k]$ and no error is detected in decoded data block $b_2[n,k]$,
        said STP unit encoding the decoded data block $b_2[n,k]$, which is received via a feedback path from at least one of the space-time decoders to said STP unit,
        removing the encoded data block from the signals received by said STP unit from said FFT modules, to form modified signals, and
        responsive to the modified signals, detecting data pertaining to block $b_1[n,k]$.

* * * * *